United States Patent [19]

Villec

[11] Patent Number: 5,042,885
[45] Date of Patent: Aug. 27, 1991

[54] INTEGRATED ANTI-LOCK BRAKING AND TRACTION CONTROL SYSTEM

[75] Inventor: George N. Villec, Ann Arbor, Mich.
[73] Assignee: General Motors Corporation, Detroit, Mich.
[21] Appl. No.: 438,174
[22] Filed: Nov. 16, 1989
[51] Int. Cl.$^5$ .............................................. B60T 8/42
[52] U.S. Cl. .................................. 303/110; 303/115; 303/116
[58] Field of Search ................. 303/68, 100, 113, 115, 303/110, 119, 61, 116; 91/168, 210, 399, 422, 432, 442, 445; 192/1.1; 310/11, 77, 80; 318/362, 741, 757

[56] References Cited

U.S. PATENT DOCUMENTS

| | | | |
|---|---|---|---|
| 3,420,580 | 1/1969 | Dymond | 303/116 |
| 3,824,895 | 7/1974 | Martin | 91/422 |
| 4,025,124 | 5/1977 | Fuchs | 303/119 |
| 4,743,075 | 5/1988 | Belart et al. | 303/110 |
| 4,756,391 | 7/1988 | Agarwal et al. | 303/100 |

FOREIGN PATENT DOCUMENTS

| | | | |
|---|---|---|---|
| 1916662 | 4/1969 | Fed. Rep. of Germany | 303/113 |
| 6401571 | 2/1964 | Netherlands | 91/422 |

*Primary Examiner*—Matthew C. Graham
*Attorney, Agent, or Firm*—Ernest E. Helms

[57] ABSTRACT

An integrated anti-lock braking (ABS)/traction control (TC) braking system in a preferred embodiment is provided for a vehicle having a fluid actuated brake including a system controller cognizant of the condition of the wheel, a master cylinder for delivering pressurized fluid to the wheel brake, an actuator frame with a bore being fluidly connected with the master cylinder and the wheel brake, first fluid line fluidly connecting the master cylinder with the wheel brake, a valve for preventing fluid communication between said master cylinder and the wheel brake through the first fluid line when the controller places the braking system in an ABS mode, a valve for preventing fluid communication between the first fluid line or the actuator bore and the master cylinder when the controller places the braking system in a TC mode, a first piston slidably mounted in the bore with a valve opening portion, a mechanism to reversibly move the piston in response to the controller, and a valve piston slidably mounted within the bore sealably separating the bore connections with the master cylinder and the wheel brake and the valve piston having a check valve preventing fluid communication from the master cylinder to the wheel brake when the first piston is nonadjacent to the valve piston and the check valve allowing fluid communication between the master cylinder and the wheel brake through the bore when the first piston valve opening portion contacts the check valve. A method of using the above mentioned apparatus is also provided.

12 Claims, 3 Drawing Sheets

INTEGRATED ANTI-LOCK BRAKING AND TRACTION CONTROL SYSTEM

FIELD OF THE INVENTION

The field of the present invention is that of an integrated anti-lock braking system (ABS) and traction control (TC) braking system for a vehicle and methods of utilization thereof.

DISCLOSURE STATEMENT

Anti-lock braking systems typically modulate the pressure delivered to a vehicle wheel brake to prevent the vehicle wheel from locking up in the braking condition. Conversely, traction control systems typically incorporate an automated braking system which actuates a brake to prevent spinning of the vehicle wheel, thereby maximizing the traction analysis of anti-lock braking systems can be found in commonly assigned U.S. Pat. Nos. 4,756,391 and 4,653,815. A more detailed explanation of traction control systems which utilize actuation of a vehicle wheel brake for traction control can be found in commonly assigned U.S. patent application Ser. No. 223,327 filed July 8, 1988.

The present invention provides an ABS/TC integration which is an alternative to that provided and described in copending U.S. patent application Ser. No. 353,895 filed May 17, 1989 and can be utilized in conjunction with the invention disclosed in copending U.S. patent application Ser. No. 353,320 filed May 17, 1989; U.S. patent application Ser. No. 352,979 filed May 17, 1989; and U.S. patent application Ser. No. 341,986 filed Apr. 24, 1989.

SUMMARY OF THE INVENTION

The present invention provides an ABS and TC integration apparatus and method of utilization thereof which allows a common actuator mechanism to provide the ABS and TC functions.

It is an object of the present invention to provide an integrated ABS/TC braking system and method utilization thereof.

Other objects and advantages of the present invention can become more apparent to those skilled in the art as the nature of the invention is better understood from the accompanying drawings and a detailed description.

DETAILED DESCRIPTION OF THE DRAWINGS

Figure 1:
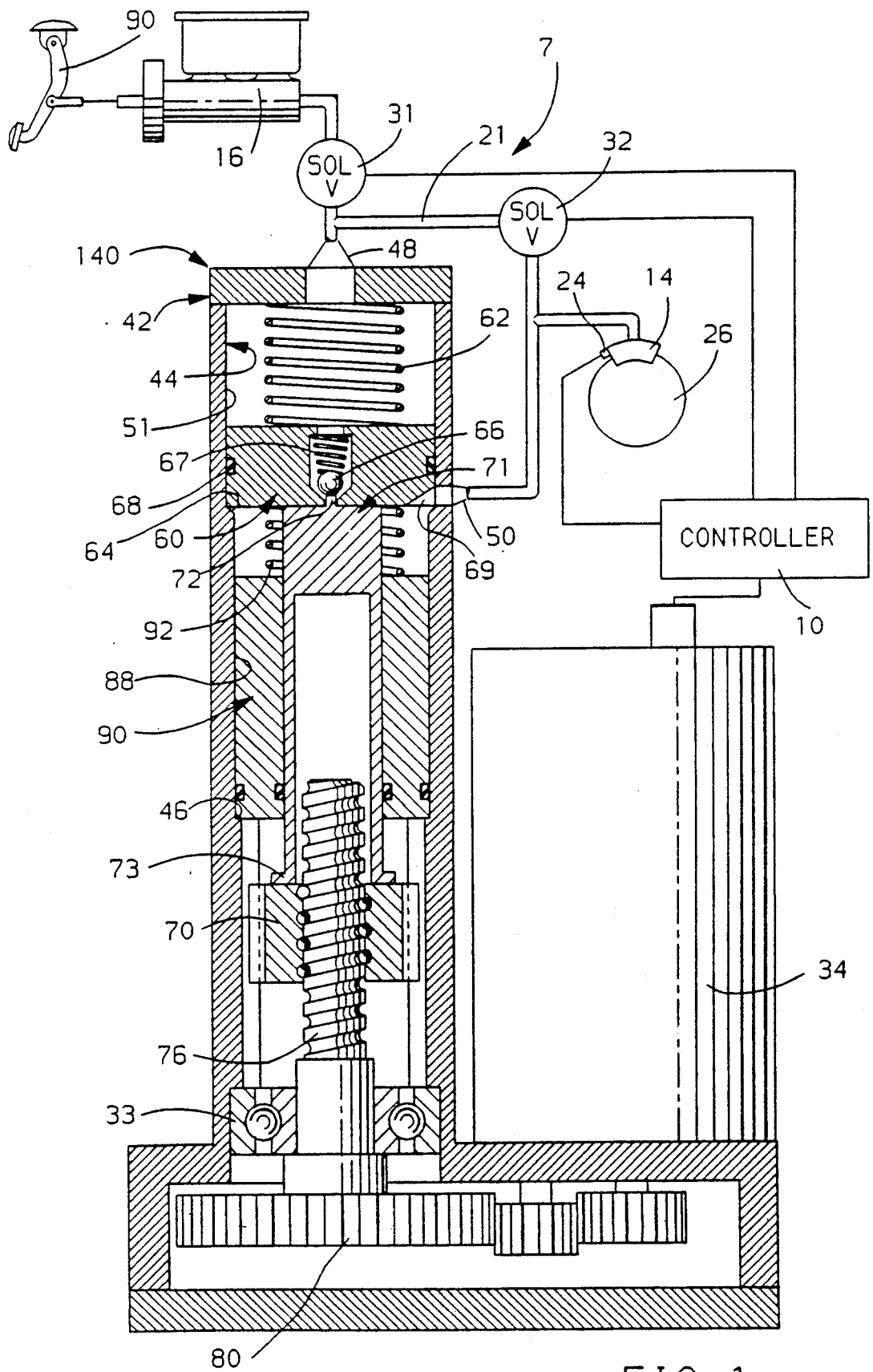
FIG. 1 is a sectional view with portions illustrated schematically of a preferred embodiment ABS/TC integrated braking system according to the present invention.

Referring to FIG. 1, an integrated anti-lock (ABS)/traction control (TC) braking system 7 has a master cylinder 16 for delivering pressurized fluid to a vehicle fluid actuated wheel brake 14 (commonly referred to as a brake cylinder). The master cylinder 16 is linked with a pedal linkage 90 which is operated by the vehicle operator. The master cylinder is fully connected with the wheel brake 14 via a first fluid line 21. On an end of the first fluid line 21, most adjacent to the master cylinder 16, is a first normally opened solenoid valve 31. On the end of the first fluid line 21 more adjacent to the wheel brake 14 is a normally opened second solenoid valve 32.

The braking system 7 has a system controller 10 which via a sensor 24 is cognizant of the condition of the vehicle's wheel(s) 26. The controller will signal the braking system 7 integration to an ABS or TC mode as required. An actuator 140 is also provided. The actuator has a frame 42 with a multidiameter longitudinal bore 44. The actuator frame longitudinal bore 44 is fluidly connected with the master cylinder 16 via a connection 48 and along its side is also fluidly connected with the wheel brake 14 via a connection 50.

Slidably and sealably mounted in a first section 51 of the longitudinal bore 44 is a valve piston 60. The valve piston is biased by a spring 62 towards an angled annular shoulder which provides a first stop 64. The spring 62 biasing the valve piston 60 against the shoulder 64 should be strong enough at a minimum to overcome the friction of the seal 68 and preferably will have added strength for a reason to be explained later.

The valve piston 60 has a spring biased check valve 66 which is normally shut preventing flow from the master cylinder 16 through the first solenoid valve 31 into the bore 44 past valve piston slot 69 and then out the radial connection 50 to the wheel brake 14. Therefore, fluid flow between the master cylinder 16 and wheel brake 14 under normal braking condition must flow through the first 31 and second 32 solenoid valves.

Mated in contact against the valve piston 60 in a home position is the first piston 71. The first piston has a rod valve opening portion 72 which when adjacent to the valve piston 60 opens the check valve 66. An alternative check valve configuration having a check valve with an extended stem according to that shown in co-assigned U.S. Ser. No. 341,986 may also be utilized. The first piston 71 is operatively associated with a nut 70 which is threadably engaged by a drive or ball screw 76. The drive screw 76 is mounted to the actuator frame 42 by a bearing 33 and is torsionally connected with a motor 34 via a gear train 80. The motor 34, gear train 80, drive screw 76 and nut 70 cooperate to provide a reversible means to move the first piston 71 in response to signals given by the controller. The first piston 71 sits to the top of the nut 70 and is biased against the first piston by the fluid pressure within the braking system 7. In an alternative embodiment the first piston 71 can be connected with the nut 70.

Slidably and sealably mounted with respect to the first piston 71 and the bore 88 is a second piston annulus 90. The second piston annulus 90 is biased by a light spring 92 against a second shoulder or stop 46 of the actuator bore 44.

In the neutral position, the valve piston 60 is resting against the first stop 64 and the first piston 71 is contacting the valve piston 60 with its valve opening portion 72 opening the check valve 66. In normal operation, the first 31 and second 32 solenoid valves are open and fluid flows for braking through the first 31 and second 32 solenoid valves from the master cylinder to the wheel brake 14. For a release of the wheel brake 14, fluid will flow in reverse through the same path. During brake apply, a slight amount of fluid will flow through the check valve 66 past the valve piston 60 and through a slight clearance between the valve piston 60 and the first piston 71 interface (or alternately a slot milled in the first piston 71 or the valve piston 60 along the interface between the two members) and to the wheel brake via the connection 50.

When an ABS condition of wheel is sensed, the controller 10 will close the second solenoid valve 32. On the initial dump cycle, the controller 10 will also signal the motor 34 to drive the drive screw 76 in such a manner which causes the first piston 71 to be pulled away from the valve piston 60. The above motion will cause an expansion in the volume of the braking system exposed to the vehicle wheel brake thereby lowering the pressure within the wheel brake 14. Upon a needed pressure reapply, the controller 10 will signal the motor 34 to reverse and the first piston 71 will again return to a position more adjacent to the valve piston 60 causing a decrease in volume of the brake system 7 exposed to the wheel brake 14 therefore increasing pressure. Typically the maximum pressure reapply will be in the neighborhood of 2000 pounds per square inch (psi) and on most occasions the full capacity for pressure reapply will not be realized. Therefore, during the ABS cycling, the first piston 71 will seldom return to its home position until the ABS condition has been overcome.

An advantage of the present invention is that if pressure reapply augmentation flow is required, it is achieved in a mechanical fashion. Augmentating the pressure delivered to the wheel brake 14 in an ABS cycle can often be desired when the ABS condition initially occurs upon a vehicle wheel 26 going over a patch of ice. When going over a patch of ice, the first piston 71 will be signaled to a retracted position to lower the brake pressure delivered to the wheel brake 14. A normal pressure reapply will be sufficient since the wheel 26 is still momentarily on a patch of ice. However, if that wheel again becomes positioned on more favorable pavement, it is desirable to greatly increase the pressure delivered to that vehicle wheel. However, upon initiation of the ABS cycle, the master cylinder 16 is isolated from the wheel brakes since the second solenoid valve 32 is closed. Additionally, the check valve 66 will be closed because master cylinder pressure is acting on the check valve 66 on a side opposite of the check valve from the first piston and due to the biasing force of a check valve spring 67.

Since the initial skidding condition occurred when the wheel brake 14 was applied when the wheel 26 was going over ice, to now increase the pressure delivered to that wheel brake 14 to take advantage of that wheel's 26 placement over more favorable pavement will require one of two things. Additional fluid may be added to the braking system by adding an auxiliary pump and providing another normally closed solenoid valve and then activating the solenoid valve to an open position to add braking fluid to the wheel brake 14. However, the above solution is not desirable since it requires the addition of another pump and another solenoid valve further adding to the expense of the braking system 7. A second solution would be to make the bore 44 longer or wider to add to the volumetric capacity of the actuator. The second above-noted solution is not desirable since it will increase the size of the actuator frame 42 and works against goals of decreasing the vehicles weight to provide greater fuel economy and may also violate the maximum spacial envelope desirable for placement of the braking system within the vehicle.

To meet the challenge of augmentating flow without adding a secondary pump or increasing the size of the actuator frame 42 the first piston 71 as previously described has a valve opening portion 72 which will unseat check 66. Upon unseating the check valve 66 fluid from the master cylinder 16 will be added into the portion of the braking system 7 exposed to the wheel brake 14 and therefore the wheel brake 14 can be pressurized to a greater extent. The augmentation fluid flow will end immediately and automatically when a sufficient pressure has been realized in the wheel brake 14 since the controller 10 will signal the motor 34 to reverse (note: the reverse signal may occur after a hold cycle). The first piston 71 will then be retracted away from the check valve 66 and thereby close off any further flow from the master cylinder 16. A slight pedal feel may be felt by the vehicle operator but the sensation will be slight and readily acceptable to most parties.

When a TC condition is realized by the controller 10, the controller will signal for the first solenoid valve 31 to close. The second solenoid valve 32 will remain open. The controller 10 will also signal the motor 34 to urge the first piston 71 upward to pressurize the wheel brake 14. The first piston 71 from its neutral (home) position adjacent to or contacting the valve piston 60 will push the valve piston 60 upward forcing fluid from the bore through the first fluid line 21 out through the second solenoid valve 32 into the wheel brake 14. An insignificant amount of fluid may also pass through the check valve 66; however, from a fluid dynamic standpoint the pressure differential between the two sides of the valve piston 60 can be assumed to be zero since both sides of the valve piston 60 are exposed to the pressure within the wheel brake 14. Therefore, the decrease in volume of the braking system 7 exposed to the wheel brake 14 will be generally proportional to the extension of the first piston 71 from the home position from which the TC mode was initiated.

Typically, the maximum pressure needed for TC (1000 psi) will be one half of the maximum that is needed for ABS (2000 psi).

The relationship of pressure versus volume at the braking system 7 will be determined by the wheel brake caliper (or piston for drum type brakes) and the compliance of the brake lines. Typically, when the braking system 7 pressure is close to zero, (the condition which exist before the initiation of TC) a large decrease in the volume of the braking system 7 exposed to the wheel brake 14 is required before a pressure increase is realized. In the ABS condition, the initial pressure within the brake system 7 exposed to the wheel brake 14 is usually much higher; therefore, a relatively small decrease in the volume of the brake system 7 exposed to the wheel brake 14 will significantly increase the pressure within the brake system 7. A more detailed discussion of the phenomenon noted above can be found in a review of U.S. patent application Ser. No. 341,986 and U.S. patent application Ser. No. 416,245, filed Sep. 29, 1989. Therefore, for a given predetermined pressure increase, the volume (of the brake system 7 exposed to the wheel brake 14) reduction required in the TC mode will be greater than that required on a pressure reapply in the ABS mode. Stated more simply, the volumetric reduction needed for a pressure to increase from 0 to 1000 psi will be greater than the volumetric reduction needed from 1000 to 2000 psi.

The force provided by the motor 34 will typically be a constant for TC or ABS. The second piston 90 is biased by a light spring 92 against the second stop 46. However, an upward movement of the first piston 71 will cause a flange 73 of the first piston 71 to set the extreme position of the two pistons 71, 90 with respect with one another thereupon they will move in unison. Since the second piston 90 is now moving along the first piston, the volumetric displacement will be greater and the brake system will reach the desired TC pressure faster with a shorter stroke of the first piston 71. The shorter stroke of the first piston 71 will allow the actuator frame 42 to be shorter.

On the release cycle, the controller 10 will actuate the first piston downward 70 and the spring 92 will push the second piston 90 downward also. From an ABS mode or a TC mode, typically the spring 62 biasing the valve piston 60 will be of such a strength that the controller 10 will signal the motor 34 to withdraw the first piston 71 and then to actuate the first piston 71 to a known current value wherein the first piston the motor will stall out placing the first piston 71 against the valve piston 60 in the home position. Therefore, a locator for the first piston 71 can be, if desired, deleted and thereupon an electromagnetic brake as taught in U.S. Ser. No. 352,971 or a clutch as taught in U.S. Ser. No. 353,320 can be utilized to maintain the first piston 71 in its home position and keep the first piston 71 from being backdriven during pressure apply of the master cylinder 16 in the normal mode of brake operation. (Note: the above assumes the use of an efficient drive screw which is not required for the use of the present invention, a non-efficient drive screw may also be utilized.)

Figure 2:
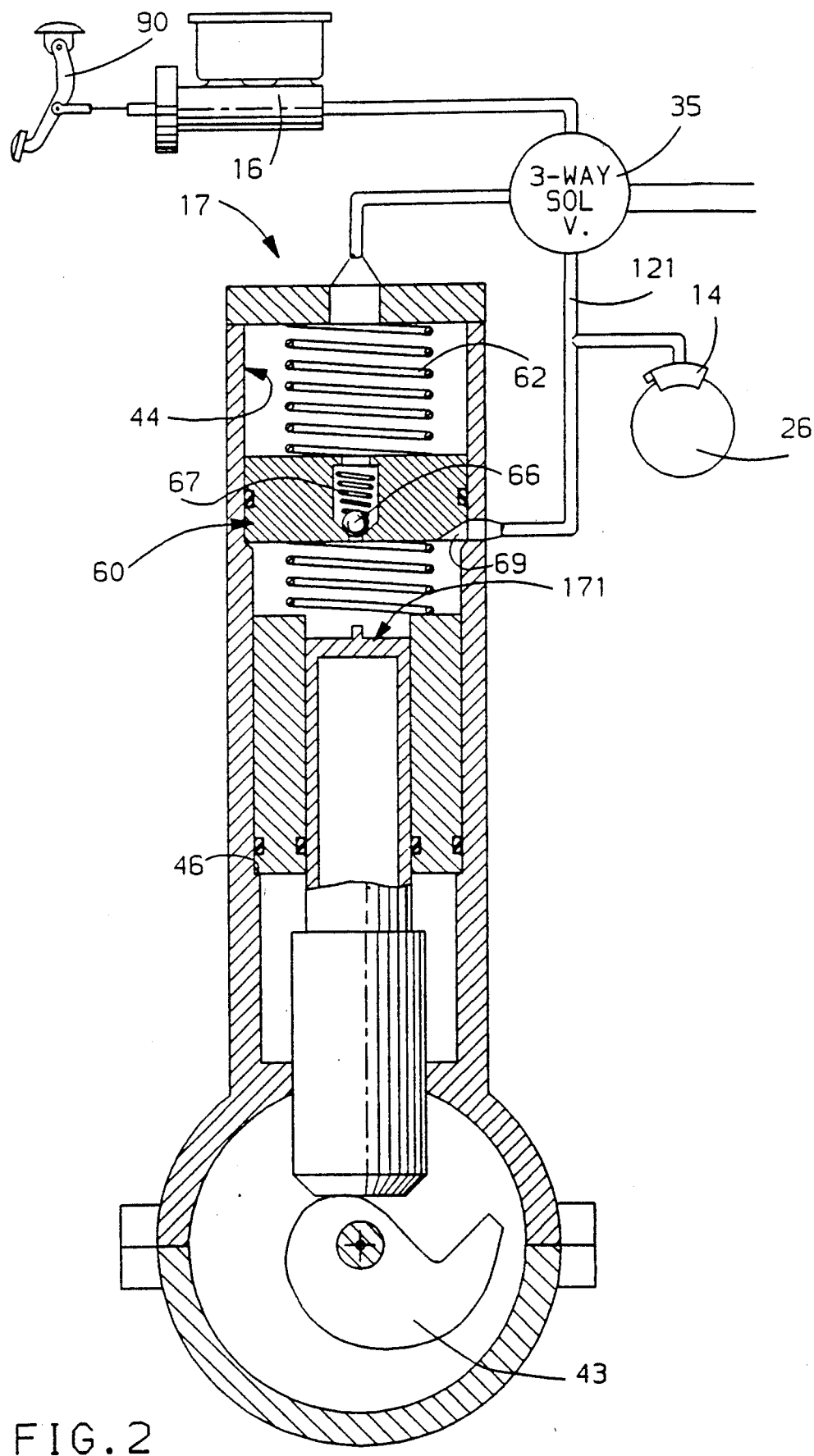
FIGS. 2 and 3 are views similar to FIG. 1 of alternative preferred embodiments of the present invention.

FIG. 2 illustrates an embodiment 17 of the present inventive brake system using a cam 43 which operatively engaged a first piston 171 directly to move the same up and down. Additionally, in an embodiment not shown, a linear electrical actuator or a hydraulic source can be utilized to move the first piston 171 up and down.

Figure 3:
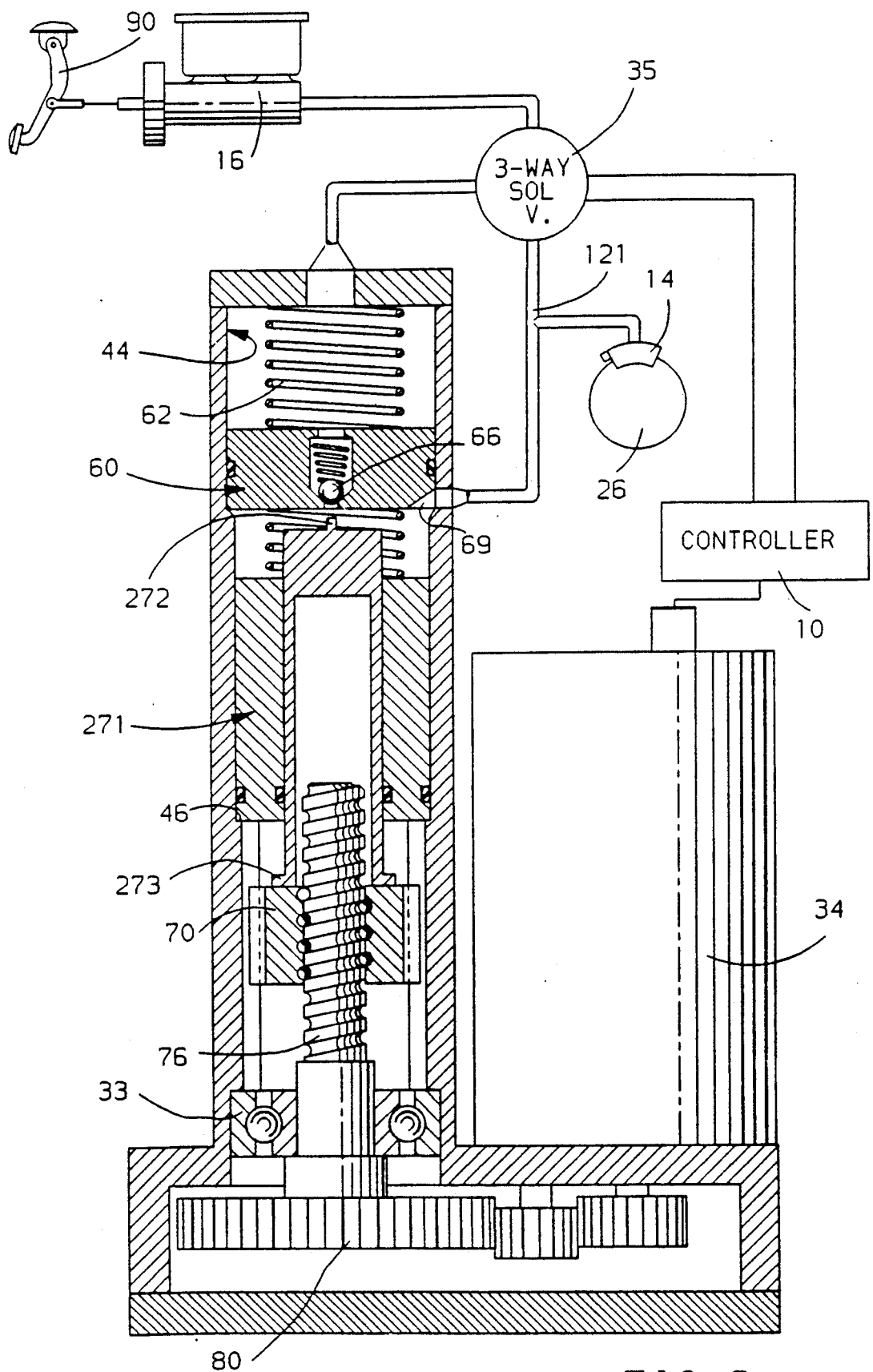

In the embodiment shown in FIG. 3 from the home position, the first piston 271 has to move upward some before contacting the valve piston 60. The remote or noncontacting home position is usually preferable since contact of the first piston with the valve piston 60 from the home position will cause a much higher load upon the motor 34 and could cause the motor 34 to stall upon the initial movement of the motor to move the first piston 271 upward. In FIG. 3, the check valve 66 is closed when the first piston 271 is in the home position, therefore, an initial ABS relief cycle the response will be faster since flow through the check valve 66 will initially be shut off, and no flow from the master cylinder 16 to the wheel brake 14 will occur after a three-way solenoid valve 35 closes off flow from the master cylinder to the wheel brake 14. In the embodiment shown in FIG. 1 a slight flow will occur until the first piston 71 is withdrawn to a point its valve opening portion 72 no longer holds the check valve 66 open.

Referring back to FIG. 3, typically from the home position, the space between the valve opening portion 272 and the ball valve 66 will be in the neighborhood of 10 to 30 thousandth of an inch. The spacing above will typically be shorter than the spacing between the first piston flange 273 and the second piston 271 (when the second piston 271 is in the rest position). However, the reverse of the above relationship may also be utilized.

Another advantage of the present invention is that the second piston and first piston can be sized for the optimum ratio between TC and ABS. However, it must be realized that for the pressurizing cycle the pressure will be affected by the force of the valve piston biasing spring 62.

In the embodiment shown in FIGS. 2 and 3 the three-way solenoid valve 35 is substituted for the first and second solenoid valves. In the first position (normal braking) the solenoid valve 35 allows free flow between the master cylinder 16, the wheel brake 14 and master cylinder 16 into top of the actuator bore 44. In a second alternative position (TC mode), the solenoid valve 35 isolates the master cylinder 16 from both the actuator bore 44 and the wheel brake 14 while allowing free flow from the actuator bore 44 via the first fluid line 121. In a third position (ABS) the solenoid valve 35 blocks flow in the first fluid line 121 and allows free flow between the master cylinder 16 and the actuator frame bore 44 as in the ABS mode, however, preventing fluid flow through the first line.

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. An integrated anti-lock braking, ABS/traction control, TC, braking system for a vehicle having a fluid actuated brake for a wheel comprising:
   a system controller cognizant of the condition of said wheel for signaling said system to an ABS or TC mode;
   master cylinder means for delivering pressurized fluid to said wheel brake;
   an actuator frame with a bore being fluidly connected with said master cylinder means and said wheel brake;
   a first fluid line fluidly connecting said master cylinder means with said wheel brake;
   means for preventing fluid communication between said master cylinder means and said wheel brake through said first fluid line when said controller places said braking system in an ABS mode;
   means for preventing fluid communication between said first fluid line and said master cylinder means and for preventing fluid communication between said actuator bore and said master cylinder means when said controller places said braking system in a TC mode;
   a first piston slidably mounted in said bore with a valve opening portion;
   means to reversibly move said piston in response to said controller; and
   a valve piston slidably mounted within said bore sealably separating said bore connections with said master cylinder means and said wheel brake and said valve piston having a check valve preventing fluid communication from said master cylinder means to said wheel brake when said first piston is nonadjacent to said valve piston and said check valve allowing fluid communication between said master cylinder means and said wheel brake through said bore when said first piston valve opening portion contacts said check valve.

2. A braking system as described in claim 1 wherein said valve piston is spring biased in a direction towards said first piston.

3. A braking system as described in claim 1 wherein said first piston is operatively associated with a nut which threadably engaged with a drive screw.

4. A braking system as described in claim 1 wherein said first piston is operatively associated with a cam which provides a reversible means to move said piston.

5. A braking system as described in claim 1 further comprising first stop means for positioning said valve piston defining in an extreme position of said valve piston in a direction towards said first piston.

6. A braking system as described in claim 1 wherein said means for preventing fluid communication between said master cylinder means and said first fluid lines and said means for preventing fluid communication between said first fluid line and said master cylinder means and between said actuator bore and said master cylinder means includes a three-way solenoid operated valve.

7. A braking system as described in claim 1 wherein said first piston has a home position and in said home position said first piston valve opening portion opens said check valve.

8. A braking system as described in claim 1 wherein said first piston has a home position and said valve opening portion does not open said check valve.

9. An integrated anti-lock braking, ABS/traction control, TC, braking system for a vehicle having a fluid actuated brake for a wheel comprising:
   a system controller cognizant of the condition of said wheel for signaling said system to an ABS or TC mode;
   master cylinder means for delivering pressurized fluid to said wheel brake;
   an actuator frame with a bore being fluidly connected with said master cylinder means and said wheel brake, said actuator frame having first and second stop means;
   a first fluid line fluidly connecting said master cylinder means with said wheel brake;
   means for preventing fluid communication between said master cylinder means and said wheel brake through said first fluid line when said controller places said braking system in an ABS mode;
   means for preventing fluid communication between said first fluid line and said master cylinder means and for preventing fluid communication between said actuator bore and said master cylinder means when said controller places said braking system in a TC mode;
   a first piston slidably mounted in said bore with a valve opening portion;
   a second piston positioned by said second stop at an extreme position with respect to said bore, said first piston having an extreme position with respect to said second piston wherein movement of said first piston beyond said relative extreme position with respect to said second position causes said first and second pistons to move in unison;
   means to reversibly move said piston in response to said controller; and
   a valve piston positioned in an extreme position with respect to said bore by said first stop means slidably mounted within said bore sealably separating said bore connections with said master cylinder means and said wheel brake and said valve piston having a check valve preventing fluid communication from said master cylinder means to said wheel brake when said first piston is nonadjacent to said valve piston and said check valve allowing fluid communication between said master cylinder means and said wheel brake through said bore when said first piston valve opening portion contacts said check valve.

10. A method of providing anti-lock braking, ABS, and traction control, TC, for a vehicle having a fluid actuated brake for a wheel, said method comprising:
   recognizing the condition of said vehicle wheel with a controller and signaling said braking system to an ABS or TC mode;
   fluidly connecting a master cylinder means and a wheel brake with an actuator having a bore;
   connecting said master cylinder with said wheel brake via a first fluid line;
   preventing fluid communication between said master cylinder means and said wheel brake through said first fluid line when said system is in an ABS mode;
   preventing fluid communication between said first fluid line and said master cylinder and between said actuator and said master cylinder means when said braking system is in a TC mode;
   slidably mounting within said bore a first piston with a valve opening portion;
   slidably mounting within said bore and sealably separating said bore connections with said master cylinder and said wheel brake with a valve piston having a check valve preventing fluid communication from said master cylinder to said wheel brake when said first piston is not adjacent to said valve piston;
   moving said first piston in response to said controller away from valve piston on an ABS relief cycle and moving said first piston towards said valve piston on ABS pressure reapply cycle and contacting said check valve to open said check valve allowing fluid communication between said master cylinder means and said brake wheel to further augment the pressure delivered to said wheel brake; and
   moving said first piston towards said valve piston to pressurizes said wheel brake in response to said controller in the first TC pressure apply cycle.

11. An integrated anti-lock braking, ABS/traction, control, TC, braking system actuator for a vehicle having a master cylinder means and a fluid actuated brake for a wheel comprising:
   a frame with a bore having fluid connections for said master cylinder means and said wheel brake;
   a first piston slidably mounted in said bore with a valve opening portion;
   means to reversibly move said piston; and
   a valve piston slidably mounted within said bore sealably separating said bore connections with said master cylinder means and said wheel brake and said valve piston having a check valve preventing fluid communication from said connection of said master cylinder means to said connection of said wheel brake when said first piston is nonadjacent to said valve piston and said check valve allowing fluid communication between said connection of said master cylinder means and said connection of said wheel brake when said first piston valve opening portion contacts said check valve.

12. An integrated anti-lock braking, ABS/traction control, TC, braking system actuator for a vehicle having a master cylinder means and a fluid activated brake for a wheel comprising:
   an actuator frame with a bore with fluid connections for said master cylinder means and said wheel brake;
   a first piston slidably mounted within said bore with a valve opening portion;

reversible means to move said first piston;

a second annular piston sealably surrounding said first piston slidable with respect to said first piston and when said second piston at an extreme position with respect to said first piston said pistons move in unison, said second piston being sealably mounted within said bore; and a valve piston slidably mounted within said bore separating said bore connections with said master cylinder means and said wheel cylinder, said valve piston having a check valve preventing fluid communication from said master cylinder means to said wheel when said first piston is adjacent to said valve piston and said check valve allowing fluid communication between said master and said wheel brake through said bore when said first piston valve opening portion contacts said check valve.

* * * * *